(12) United States Patent
Klapproth et al.

(10) Patent No.: US 7,416,901 B2
(45) Date of Patent: Aug. 26, 2008

(54) METHOD AND COATING APPARATUS FOR THE MANUFACTURE OF A MICROARRAY

(75) Inventors: Holger Klapproth, Freiburg (DE); Mirko Lehmann, Freiburg (DE)

(73) Assignees: Micronas GmbH (DE); Micronas Holding GmbH

( * ) Notice: Subject to any disclaimer, the term of this patent is extended or adjusted under 35 U.S.C. 154(b) by 80 days.

(21) Appl. No.: 10/876,278

(22) Filed: Jun. 24, 2004

(65) Prior Publication Data

US 2005/0042866 A1    Feb. 24, 2005

(30) Foreign Application Priority Data

Jun. 25, 2003    (DE)    ............... 103 28 730

(51) Int. Cl.
| | |
|---|---|
| G01N 35/08 | (2006.01) |
| G01N 1/00 | (2006.01) |
| G01N 33/53 | (2006.01) |
| B01L 3/00 | (2006.01) |
| A61L 2/00 | (2006.01) |
| A61L 9/00 | (2006.01) |

(52) U.S. Cl. ............... 436/174; 436/52; 435/7.1; 422/99; 422/102; 422/104; 422/292

(58) Field of Classification Search ............... 436/52, 436/174; 435/7.1; 422/99, 102, 104, 292
See application file for complete search history.

(56) References Cited

U.S. PATENT DOCUMENTS

| | | | |
|---|---|---|---|
| 5,948,621 A | 9/1999 | Turner et al. | |
| 6,235,473 B1 | 5/2001 | Friedman et al. | |
| 2001/0000749 A1 | 5/2001 | Zinn, Jr. et al. | |
| 2002/0004204 A1* | 1/2002 | O'Keefe | 435/6 |
| 2002/0127563 A1 | 9/2002 | Salafsky | |

FOREIGN PATENT DOCUMENTS

| | | |
|---|---|---|
| DE | 199 07 164 A1 | 9/2000 |
| DE | 101 32 761 A1 | 2/2003 |
| EP | 0 505 632 A1 | 9/1992 |

(Continued)

OTHER PUBLICATIONS

Brett D. Martin et al.; Microarray Fabrication Using a Hydrogel Stamper; Journal; Jul. 21, 1998; pp. 3971-3975; vol. 14, No. 15; American Chemical Society; published on Web Jul. 3, 1998.

(Continued)

*Primary Examiner*—Jill Warden
*Assistant Examiner*—Keri A Moss
(74) *Attorney, Agent, or Firm*—The Webb Law Firm

(57) ABSTRACT

In a method for the manufacture of a microarray, surface areas of a chip are brought into contact with different aqueous solutions that contain at least one coating substance. For each of the individual surface areas, an absorbent substrate is provided and is filled with the solution that is to be brought into contact with the surface area in question. Then, for the printing of the surface area with the at least one coating substance contained in the solution, each substrate is brought into contact with the surface area in question.

10 Claims, 4 Drawing Sheets

FOREIGN PATENT DOCUMENTS

| | | |
|---|---|---|
| WO | WO 99/39829 A | 8/1999 |
| WO | WO 00/43539 A | 7/2000 |
| WO | WO 02/079752 A2 | 10/2002 |
| WO | WO 02/089982 A | 11/2002 |

OTHER PUBLICATIONS

Jeonggi Seo, Elif Ertekin, Michael S. Pio, and Luke P. Lee; "Self-Assembly Templates By Selective Plasma Surface Modification Of Micropatterned Photoresist"; 4 pp.; Berkeley Sensor & Actuator Center and Department of Bioengineering, University of California at Berkeley, CA, USA.

T. Vo-Ding, J. P. Alarie, N. Isola, D. Landis, Al L. Wintenberg, and M. N. Ericson; "DNA Biochip Using a Phototransistor Integrated Circuit"; Jan. 15, 1999; 6 pp.; vol. 71, No. 2; Analytical Chemistry; USA.

\* cited by examiner

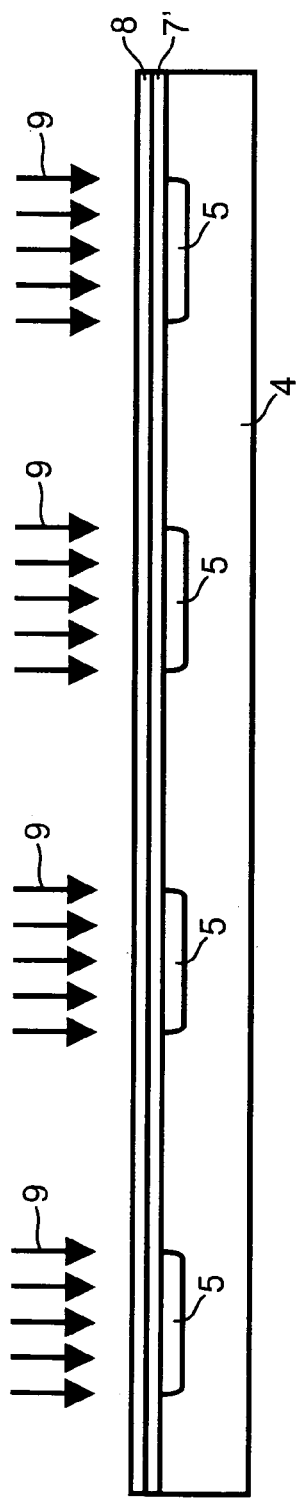
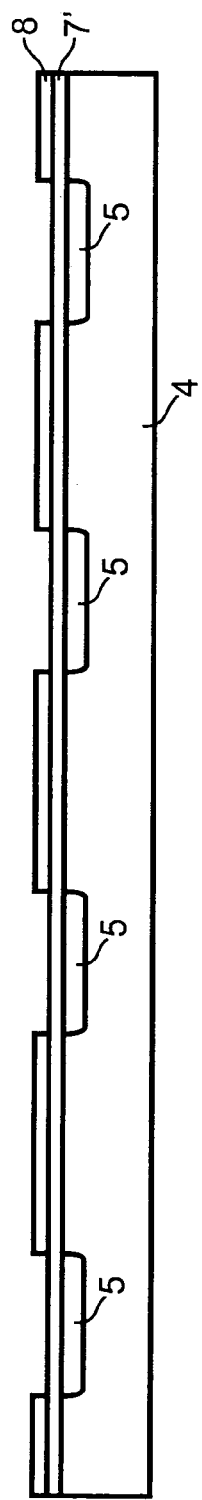
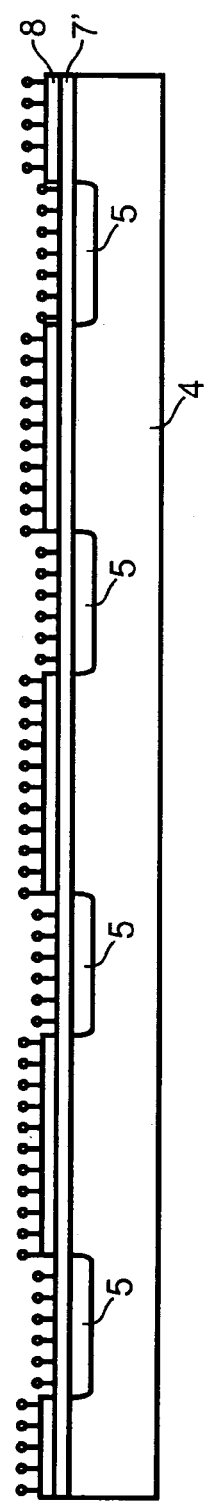
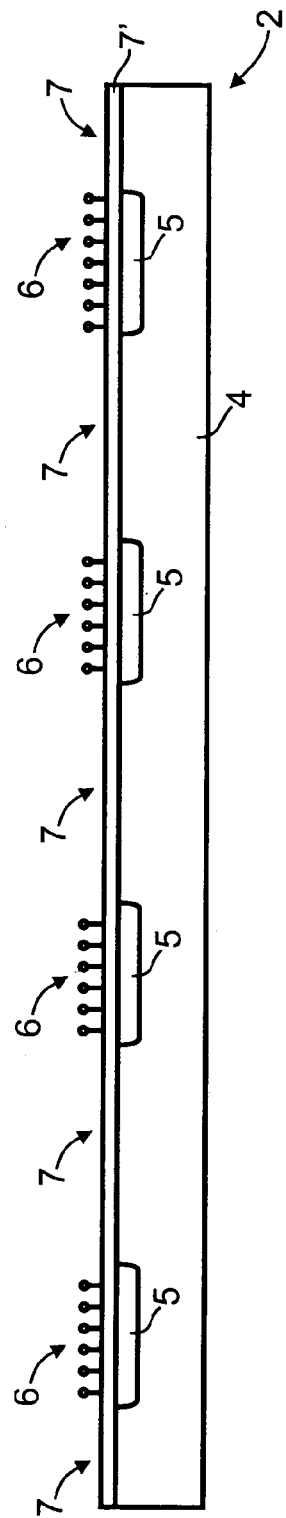

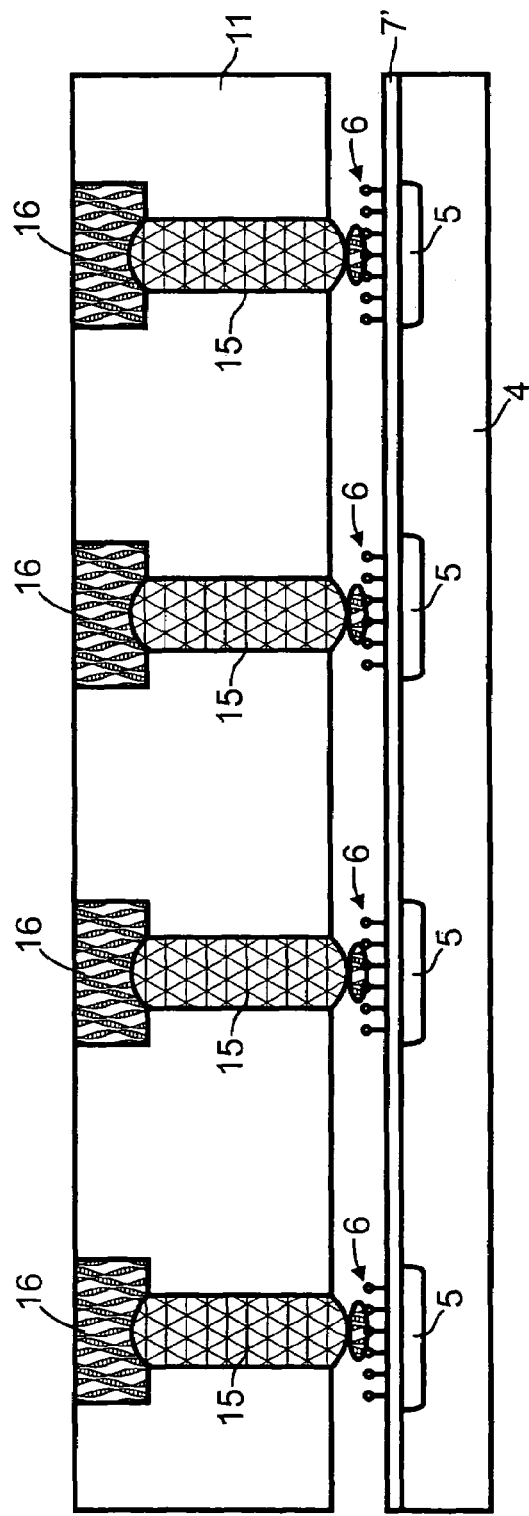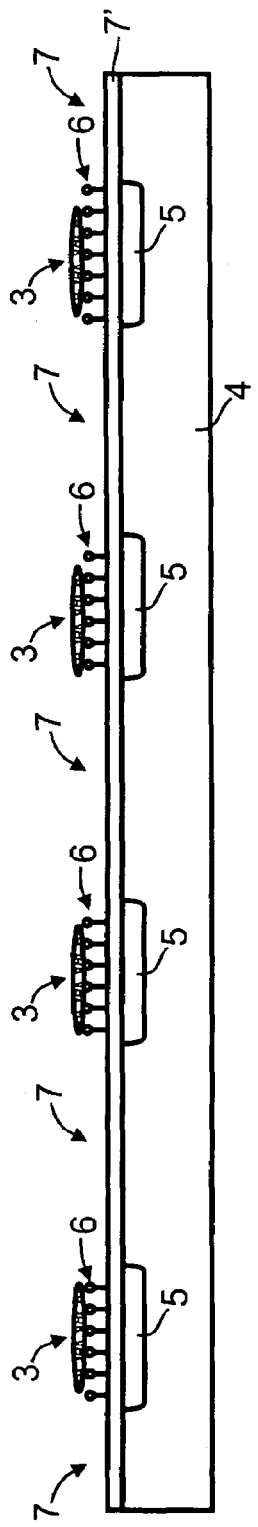

METHOD AND COATING APPARATUS FOR THE MANUFACTURE OF A MICROARRAY

BACKGROUND OF THE INVENTION

1. Field of the Invention

This invention relates to a method for the manufacture of a micro array, whereby surface areas of a chip are brought into contact with different aqueous solutions that contain at least one coating substance. The invention also relates to an apparatus to provide a chip for a micro array with aqueous substances that contain coating substances.

2. Description of the Prior Art

A method of this type for the manufacture of a micro array and an apparatus for the coating of a chip of a micro array are known from DE 101 32 761 A1. In that apparatus, a planar glass plate is used, the surface of which is structured so that it has hydrophobic and hydrophilic coating areas. Then, on the hydrophilic surface areas, small-volume aqueous probes in the range of picoliters to nanoliters are applied. For the positioning of the hydrophilic surface areas underneath the dispenser, the glass plate is moved relative to the dispenser. The construction of the dispenser is not described in any further detail in the above referenced unexamined application, although in practice it is customary for the deposition of biological or biochemical samples to use a nanoliter pipette that has a capillary filled with the aqueous solution, has a discharge opening on its one end and a piezoelectric actuator on its other end, by means of which the solutions in the capillary can be transported to the discharge opening, where they can be dispensed in the form of a microdrop. A nanoliter pipette of this type is described, for example, in T. Vo-Dinh et al., DNA Biochip Using a Phototransistor Integrated Circuit, Analytical Chemistry, Vol. 71, No. 2 (Jan. 15, 1999). The nanoliter pipette, however, has the disadvantage that as the drop separates from the discharge opening, the microdrop can be deflected slightly to the side. The microdrop can consequently land to one side of the surface area of the chip that is to be coated with the aqueous solution, where it becomes mixed on a neighboring surface area of the chip with a solution that is different from the original aqueous solution, or with another aqueous solution that will subsequently be applied. The danger of a mixing of this type is present particularly when the individual areas to be coated are located very close to one another so that as many fields as possible can receive different coatings on a chip with compact dimensions. However, the entire micro array is unusable if the chip is coated incorrectly in even one single location.

The object of the invention is therefore to create a method and an apparatus of the type described above that make possible a fast, simple and reliable deposition of the coating areas on the chip.

SUMMARY OF THE INVENTION

The invention teaches that an individual absorbent substrate is prepared for each individual surface area and is filled with the solution that is to be placed in contact with the surface area in question, and that for the printing of the surface area with the at least one coating substance contained in the solution, each substrate is then placed in contact with the surface area in question.

The surface areas are therefore printed using a pad printing method, which makes possible a fast and simple deposition of the solutions on the chip. The substrates can thereby be realized in the form of stamp pads that absorb the solutions and, when they come in contact with the surface areas, transfer the solutions to them. Because the substrate comes into contact with the surface of the chip during the printing process, the aqueous solution can be positioned with great accuracy on the chip at the point of contact. Even when the surface areas in question are small, this method therefore makes it possible to achieve a reliable and accurately-positioned deposition of the solutions on the chip. After the solutions have been deposited on the surface areas, the coating substance is bonded to the respective surface area. The water contained in the solution can then be removed from the surface area, for example by rinsing.

The coating materials contained in the solutions are preferably biomolecules, in particular nucleic acids or derivatives thereof (DNA, RNA, PNA, LNA, oilgonucleotides, plasmids, chromosomes), peptides, proteins (enzymes, proteins, oilgopeptides, cellular receptor proteins and complexes thereof, peptide hormones, antibodies and fragments thereof), carbohydrates and their derivatives, in particular glycolized proteins and glycosides, fats, fatty acids and/or lipids. The method makes it possible to immobilize biomolecules of this type simply by means of water, and therefore without the use of chemical substances on the surface of the chip. The coating materials to be deposited on the surface of the chip, however, can also include water-soluble organic and/or inorganic chemical substances, of the type used in combinatorial chemistry, for example.

In one advantageous configuration of the method, the surface of the chip is structured so that hydrophilic surface areas are separated from one another by at least one hydrophobic surface area, whereby the absorbent substrates filled with the solutions are then placed in contact with the hydrophilic surface areas. The hydrophilic surface areas of the chip make it possible to achieve a good wetting with the aqueous solutions, even when the surface areas in question are small. The at least one hydrophobic surface area located between the hydrophilic surface areas thereby forms a barrier for the solutions which prevents a solution that is placed in contact with a hydrophilic surface area from coming into contact with a hydrophilic surface area that is next to the first surface area.

In one advantageous realization of the invention, to structure the surface, a hydrophobic coating is deposited on the surface of the chip, whereby the hydrophobic layer is then coated with a photosensitive resist, whereby the resist is masked by irradiation and is removed in the locations where the hydrophilic surface areas will later be located, whereby the areas of the hydrophobic layer that are exposed in this manner and the remaining areas of the resist are preferably activated to become hydrophilic by plasma etching, and whereby the resist is then removed and the hydrophobic areas located underneath are exposed. The hydrophobic layer can thereby be a polyimide layer. The resist is preferably removed from the exposed places on the chip by etching. The surface of the chip can therefore be structured easily using processes that are standard in semiconductor manufacture to form the hydrophobic and hydrophilic surface areas claimed by the invention.

In another advantageous configuration of the method, for the structuring of the surface, a hydrophilic layer is deposited on the surface of the chip, whereby the hydrophilic coating is then coated with a photosensitive resist, whereby the resist is masked by irradiation and is removed in the locations in which the hydrophobic areas are later to be located, whereby a hydrophobic layer is deposited on the thus exposed areas of the hydrophilic layer and the remaining area of the resist, and whereby the resist is then removed and the areas of the hydrophilic layer underneath are exposed. The hydrophilic coating on a chip manufactured from a semiconductor material using a CMOS process can be a silicon dioxide layer (SiO$_2$) and the hydrophobic layer can be a silicon-nitrite coating (Si$_3$N$_4$).

In an additional advantageous configuration of the method, for the structuring of the surface, a hydrophobic coating is deposited on the surface of the chip, whereby a photo-polymerizable coating is deposited on the hydrophobic coating, and whereby this layer is polymerized with optical radiation into a hydrophilic polymer layer in the locations where hydrophilic surface areas are intended to be. With this method, too, the chip can be patterned in a simple manner by optical masking. A layer of organic hydrophobic molecules, for example a polyimide layer, is preferably deposited on the surface of the chip as the hydrophobic layer.

Of course it is also possible that for the structuring of the surface, a hydrophilic layer can be deposited on the surface of the chip, that a photo-polymerizable layer is deposited on the hydrophilic layer, and that this layer is polymerized by masking with optical radiation into a hydrophobic polymer layer in the locations where the hydrophobic surface areas are intended to be.

It is particularly advantageous if openings are introduced in the surface of a mounting plate that correspond to the locations in which the hydrophilic surface areas of the chip are located, if the substrates are located in these openings so that they each project with a portion of their area out of the opening and above the surface of the mounting plate, and if for the printing of the hydrophilic surface areas of the chip, the mounting plate and the chip are positioned relative to each other so that the projecting areas of the substrate each come into contact with a corresponding hydrophilic surface area of the chip. Therefore a stamp or a printing plate is created that has a plurality of stamp pads located on a mounting plate, the number of which preferably equals the number of hydrophilic surface areas of the chip. By means of this stamp or printing plate, a plurality and preferably all of the hydrophilic surface areas can be brought into contact simultaneously with the solutions intended for them. The substrates can be filled with the solutions using standard method, e.g. by pipetting. The method makes possible the fast, simple and economical series manufacture of microarrays.

The openings in the mounting plate for the introduction of the substrates are preferably filled with a polymerizable mixture, whereby the mixture is then polymerized and preferably cross-linked. The mixture can contain bis methyl acrylamide. During the cross linking, the polymer chains of the mixture form a water-insoluble three-dimensional network or lattice structure. The polymer-crosslinked substrates swell when they are filled with the aqueous solutions, whereby they project out of the openings and above the surface of the mounting plate to form the stamp pads which, when the mounting plate is positioned on the chip, come into contact with the hydrophilic surface area of the chip.

In an additional advantageous embodiment of the invention, the openings in the mounting plate for the introduction of the substrates are filled with at least one monomer, whereby the monomer is then polymerized, preferably by bringing it in contact with a polymerization initiator. The monomer can thereby be acrylamide and the polymerization initiator ammonium preoxosulfate. The openings can also be filled with a mixture of a number of monomers.

It is advantageous if, before the filling of the openings are filled with the polymerizable mixture and/or the monomer, the interior walls of the openings are coated with a silane which can have a chemical group that, when brought into contact with the monomer, is capable of initiating the polymerization. The silane preferably has one of the structures illustrated below, which are described in greater detail in WO 00/43539 A2, in particular on Page 11:

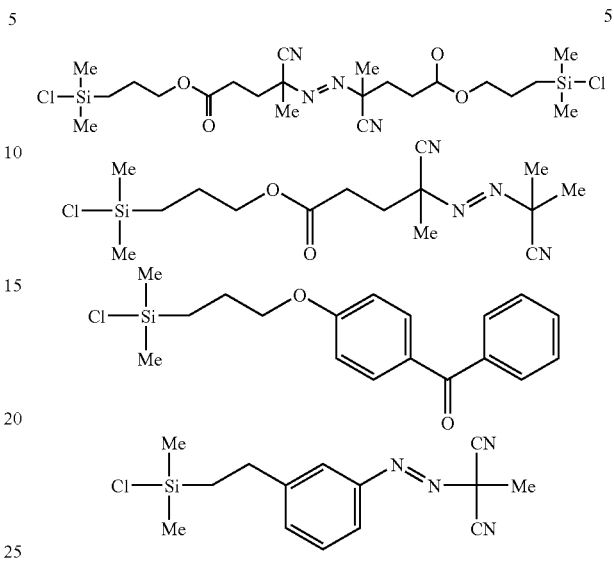

In an underpressure or a vacuum, the mounting plate is advantageously immersed in the polymerizable mixture and/or the monomer so that the polymerizable mixture or the monomer penetrates into the openings, whereby the underpressure or the vacuum is then removed. In this manner, all the openings can be filled with the mixture or with the monomer simply and simultaneously, without the formation of bubbles.

It is advantageous if the openings are realized in the form of openings all the way through and transverse to the plane of extension of the mounting plate, and if the solutions containing at least one coating substance are fed to the substrates on the reverse side of the mounting plate that faces away from the chip in the use position.

It is thereby even possible that on the reverse side of the mounting plate, reservoirs can be formed, each of which is connected with a corresponding opening in the mounting plate, whereby these reservoirs are filled with the solutions that contain the at least one coating substance. With the printing apparatus formed by the mounting plate, the substrates and the reservoirs, a number of chips can then be printed one after another. The reservoirs are preferably located directly above the openings on the upper side of the mounting plate, so that the quantities of the solution that are transferred during printing from the substrates to the chips can flow assisted by gravity out of the reservoirs into the substrates.

In an additional advantageous embodiment of the invention, the openings are introduced into the mounting plate in the form of blind holes. The solutions contained in the substrates are therefore unable to evaporate as easily out of the openings.

With regard to the apparatus, the invention teaches that a mounting plate is provided with openings, in each of which a substrate that is absorbent for aqueous solutions is located, a portion of which substrate projects out of the opening to form a stamp pad and that the substrates are filled with different aqueous solutions that contain at least one coating substance.

By means of this device, a plurality of different solutions can be deposited simultaneously on the individual surface areas of a chip, by positioning the mounting plate on the chip so that the stamp pads are each pressed onto a corresponding surface area of the chip, and the surface areas are wetted with the solution that is stored in the substrates. The surface areas of the chip that correspond to the apparatus are preferably realized so that they are hydrophilic and are separated from one another by hydrophobic areas.

It is advantageous if the substrates located in the openings are polymer substrates that can swell in an aqueous solution. The polymer substrates can then be easily introduced into the openings dissolved in a solvent, and the polymer contained in the openings can then be cross-linked. During the subsequent filling of the polymer substrates with the aqueous solutions, the polymer substrates swell, whereby a portion of each substrate is displaced out of the openings and forms the stamp pads that projects above the surface of the mounting plate.

In one preferred embodiment of the invention the interior walls of the openings are each coated with a silane layer which is in contact with the swellable polymer located in the opening. This arrangement makes possible a good adherence of the substrates to the mounting plate. It is particularly preferred if the silane and the polymer are covalently bonded.

However, an effective adherence of the substrates to the interior walls of the openings can also be achieved if the interior walls of the openings have projections and/or recesses that engage the substrates from behind. The projections and/or recesses can be created according to the method disclosed in DE 199 07 164 C2.

It is advantageous if the openings are realized in the form of openings that run all the way through the mounting plate at a right angle to its plane of extension, if on the one end of each of the individual openings there is a portion of the substrate that projects beyond the surface of the mounting plate and the other end of each opening is connected with a reservoir to hold a solution corresponding to each opening. The reservoirs preferably thereby have a cross section that is larger than the cross section of the openings and represent a linear continuation of them, so that the reservoirs can be filled in a simple manner, e.g. using a pipette, from the reverse side of the mounting plate facing away from the stamp pads.

The mounting plate is preferably made of a semiconductor material, in particular silicon, and on its surface preferably has a microfiber membrane which has the hydrophilic surface areas and the at least one hydrophobic surface area. During the manufacture of the apparatus, the openings that hold the substrates can then be introduced with great precision into the semiconductor material using processes that are standard in the semiconductor industry.

BRIEF DESCRIPTION OF THE DRAWINGS

Several exemplary embodiments of the invention are explained in greater detail below with reference to the accompanying drawings, some of which are schematic and greatly simplified.

FIGS. 1 to 4 show the individual process steps in the structuring of a mounting plate with hydrophilic surface areas arranged in a matrix pattern, which are separated from one another by a hydrophobic surface area.

FIG. 8 shows the mounting plate illustrated in FIG. 4 during the printing of the hydrophilic surface areas by means of the apparatus illustrated in FIG. 7, FIG. 9 shows a mounting plate, the hydrophilic surface areas of which are printed with different biomolecules.

DETAILED DESCRIPTION OF THE PREFERRED EMBODIMENTS

Figure 5:
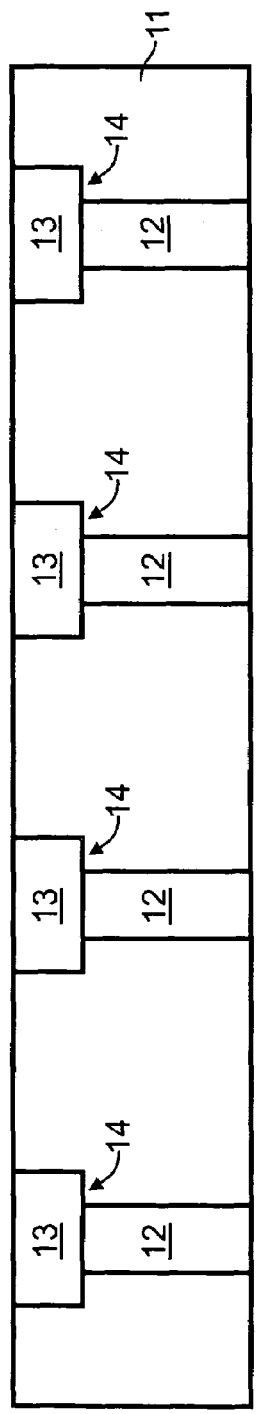
FIG. 5 shows a cross section through a mounting plate which has openings that run all the way through and are arranged in a matrix pattern, each of which is connected with a reservoir.
Figure 6:
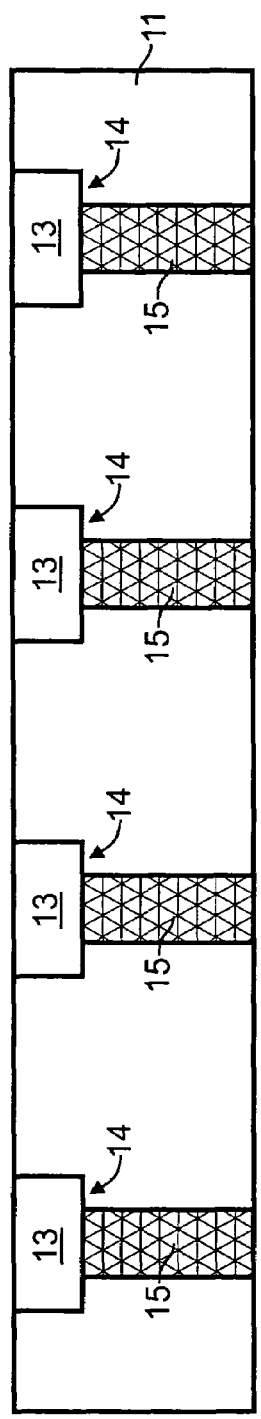
FIG. 6 shows the mounting plate illustrated in FIG. 5 after the openings have been filled with absorbent substrates.

In a method for the manufacture of a micro array 1, which consists of a mounting plate 2 on which as number of different-shaped coating areas 3 are arranged next to one another in a matrix pattern, a semiconductor wafer is first manufactured as the base body 4 for the mounting plate 2. FIG. 1 shows that the base body 4 has, in a layer near the surface, photodetectors 5 which are integrated into the semiconductor material of the base body 4 using methods from the semiconductor manufacturing industry. The photodetectors 5 are connected to an analysis device by means of conductors that are not shown in any greater detail and can also be integrated into the semiconductor wafer.

The surface of the base body 4 is structured so that hydrophilic surface areas 6 are separated from one another by at least one hydrophobic surface area 7. For that purpose, first a hydrophobic layer 7', e.g. a polyimide or polystyrene layer, is deposited on the base body 4. Then the resist 8 is irradiated through a mask with optical radiation 9 in the locations where the hydrophilic surface areas 6 are ultimately intended to be located. These locations are arranged in a matrix pattern in a plurality of rows and columns on the surface of the chip 2 and are separated from one another. The resist 8 is destroyed by the exposure or transformed into a soluble resist that is removed by means of a solvent, so that the hydrophobic surface areas 6 are uncovered in the exposed locations (FIG. 2). In a further process step, the exposed area of the hydrophobic layer 7' and the remaining areas of the resist 8 thus exposed are activated to become hydrophilic by plasma etching (FIG. 3). Then the resist is completely removed, so that the hydrophobic areas 7 underneath are exposed. On the surface of the chip 2 there are now a plurality of hydrophilic surface areas 6 in a matrix pattern, which are separated by one another by a hydrophobic surface area 7 surrounding them. The hydrophobic surface area 7 thereby forms a barrier for aqueous solutions 16 to be imprinted on the hydrophilic surface areas 6.

An apparatus that is designated 10 overall is intended for the application of the solutions 16 on the hydrophilic surface areas 6,. For that purpose, in a mounting plate 11 made of silicon, a plurality of openings 12 arranged in a number of rows and columns in a matrix pattern are introduced, the longitudinal direction of which runs at approximately a right angle to the plane of extension of the mounting plate 11. The location of the openings 12 corresponds to the arrangement of the hydrophilic surface areas 6 of the chip 2 to be printed. The openings 12 can be introduced, for example, by the deposition of an etch-resistant mask which has interruptions at the locations where the openings 12 will be, and the subsequent application of an etching agent to the mounting plate 11.

In the exemplary embodiment illustrated in FIG. 1, reservoirs 13 are also introduced into the mounting plate 11, are arranged as a linear extension of the openings 12 and continue said openings 12. FIG. 5 shows that the holes formed by the openings 12 and the reservoirs 13 run all the way through the mounting plate 11. Of course, a reverse process is also possible, in which first the reservoirs 13 and the openings 12 are introduced into the mounting plate 11. The internal walls of the openings 12 are coated with a 4,4'-azo bis-(4-cyano pentanoic acid (3'-chlorodimethylsilyl) propyl ester) or a corresponding monofunctional or multifunctional chloro-silane or alkoxy silane.

The reservoirs 13 have a larger cross section than the openings 12. FIG. 5 shows clearly that at the transition from the openings 12 to the reservoirs 13, there is a shoulder or an offset 14, at which point the clear width of the holes, beginning from the opening 12 toward the reservoir, becomes wider.

The openings 12 are then filled with a solution that contains a polymerizable mixture and a polymerization initiator, preferably 4,4'-azo bis-(4-cyano pentanoic acid (3'-chlorodimethylsilyl) propyl ester) or a corresponding monofunctional or multifunctional chloro-silane or alkoxy silane. As a polymerizable mixture, the solution can contain acrylamide which is dissolved in water. In a vacuum, the mounting plate 11 is immersed with the openings 12 facing down and the reservoirs 13 facing up in the solution so that the level of the surface of the solution is approximately at the level of the shoulder 14. Then the polymerizable mixture containing the solution in the openings 12 is polymerized by means of a polymerization initiator, whereby the polymer is cross-linked and forms an absorbent substrate 15. During the cross-linking the polymer bonds to the silane layer which is located on the interior wall of the opening 12.

Figure 7:
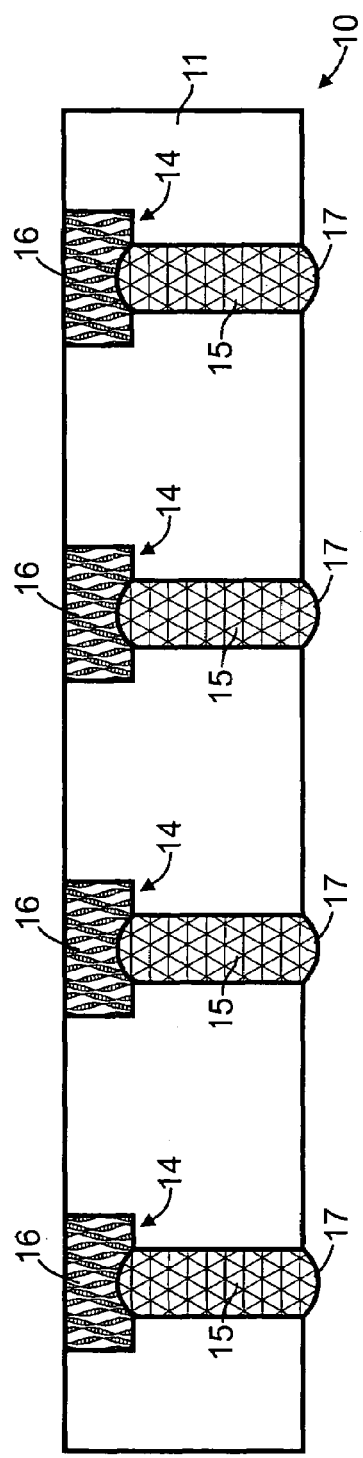
FIG. 7 shows the apparatus illustrated in FIG. 6 after the reservoirs have been filled with aqueous biomolecule solutions.

In a further step, the reservoirs 13 are filled with aqueous solutions 16 (FIG. 7) which contain different biomolecules such as DNA strands, for example, with which the hydrophilic surface areas 6 of the chip 2 are to be coated. The aqueous solutions 16 can be placed in the reservoirs 13 by means of a pipette, for example. The solutions 16 thereby come into contact with their respective corresponding substrates 15 and are absorbed by them. The substrates 15 thereby swell up and increase their volume such that they each project out of their openings 12 on the end farther from the corresponding reservoirs 13 and form projections that act as stamp pads 17.

For the printing of the hydrophilic surface areas, the mounting plate 11 and the chip 2 are positioned relative to each other so that the stamp pads 17 are each brought into contact with a corresponding hydrophilic surface area 6 of the chip 2. The hydrophilic surface area 6 is thereby wetted with the aqueous solution 16 that is stored in the substrate 15. FIG. 8 shows that one small drop of the aqueous solution 16 is transferred from the substrate 15 to the hydrophilic surface area 6. The biomolecules contained in the solution adhere to the hydrophilic surface areas 6, whereupon the water contained in the solution is rinsed from the hydrophilic surface area 6 (FIG. 9).

The individual coating areas 3 form receptors, each of which is bond-specific for a certain ligand and forms a receptor-ligand complex. The bonding can be verified in a known manner by means of luminescence radiation which can be measured by means of the photodetectors 5 located directly underneath the coating areas 3.

Figure 10:
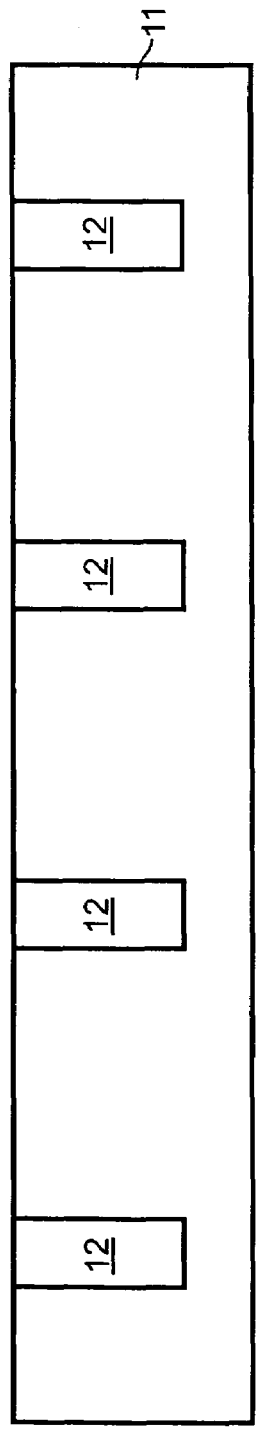
FIG. 10 shows a cross section through a mounting plate which has blind holes arranged in a matrix pattern.
Figure 11:
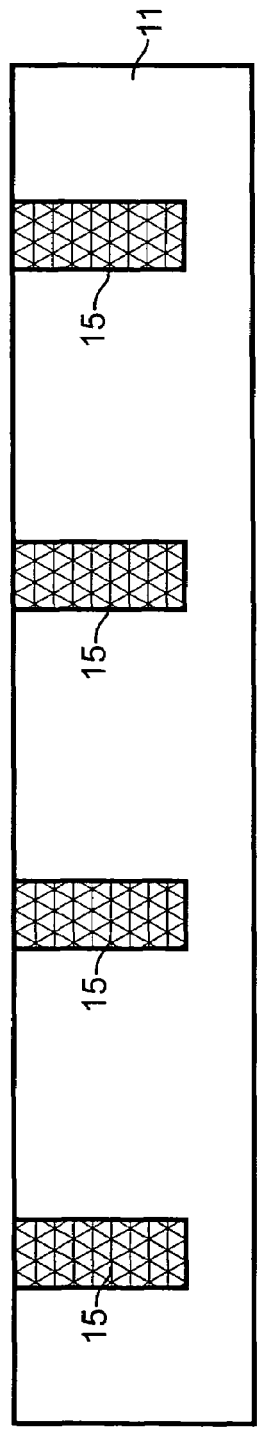
FIG. 11 shows the mounting plate illustrated in FIG. 11 after the blind holes have been filled with absorbent substrates.
Figure 12:
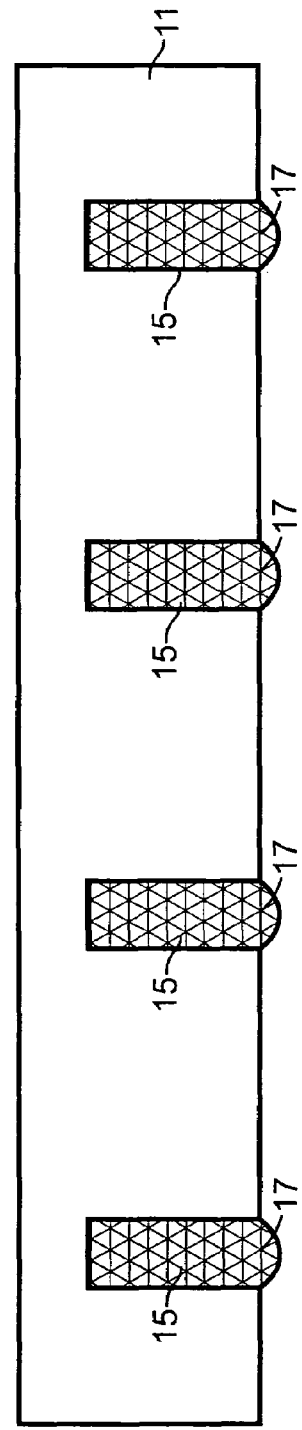
FIG. 12 shows the apparatus illustrated in FIG. 11 after the substrates have been filled with aqueous biomolecule solutions.

FIGS. 10 to 12 illustrate the individual steps for the manufacture of an additional exemplary embodiment of an apparatus 10 for the printing of the hydrophilic surface areas 6 of the chip 2. First the openings 12 are introduced into the mounting plate 11 in the form of blind holes, for example by the deposition of an etch-resistant mask and then by bringing the mounting plate 11 into contact with an etching agent. The arrangement of the openings 12 corresponds to the arrangement of the hydrophilic surface areas 6 of the chip 2 to be printed.

Then the openings 12 are filled with a polymer solution. For this purpose, the mounting plate 11 is immersed in the polymer solution in a vacuum, and then the vacuum is removed, so that the polymer solution is pressed into the openings 12 by atmospheric pressure. Then a polymer contained in the polymer solution in the openings 12 is polymerized, whereby it cross-links and forms an absorbent substrate 15 (FIG. 11). The internal wall of the opening 12 can be coated with a silane to which the polymer adheres. A graft polymer thereby results. The substrates 15 are filled with the individual aqueous solutions 16, whereby the substrates 15 swell and a portion of the each substrate projects out of the respective opening 12 to form a stamp pad 17. The hydrophilic surface areas of the chip 2 are printed using the apparatus 10 obtained in this manner.

The invention claimed is:

1. A method for the manufacture of a microarray, whereby hydrophilic surface areas of a chip are placed in contact with different aqueous solutions containing at least one coating substance, comprising the steps of (a) for each of the individual surface areas an absorbent substrate is prepared on a mounting plate, and is filled with the solution to be brought into contact with the individual surface area, and (b) for the printing of the surface area with the at least one coating substance contained in the solution, the substrate is then brought into contact with the individual surface area, wherein the surface of the chip is structured so that the hydrophilic surface areas are separated from one another by at least one hydrophobic surface area, wherein in the surface of the mounting plate, in locations that correspond to the locations in which the hydrophilic surface areas of the chip are located, openings are introduced, the substrates are located in these openings so that they each project with a portion of their area out of the opening above the surface of the mounting plate, and for the printing of the hydrophilic surface areas of the chip, the mounting plate and the chip are positioned relative to each other so that the projecting areas of the substrates each come into contact with a corresponding hydrophilic surface area of the chip so that the coating substance contained in the solution adheres to the hydrophilic surface to form a receptor, which is bond-specific for a certain ligand and forms a receptor-ligand complex, the bonding of which is measured by means of photodetectors located directly underneath the coating substance, wherein on a side of the mounting plate opposite the side facing the chip, reservoirs are formed in the mounting plate, each of which is located adjacent to and connected with a corresponding opening in the mounting plate, wherein the reservoirs are filled with solutions that contain at least one coating substance, wherein the reservoirs have a larger cross section than the openings, wherein the mounting plate is a single, one-piece construction and the reservoirs and openings are integrally formed in the mounting plate;

wherein the arrangement of the reservoirs relative to their corresponding opening and the construction of the reservoirs enable the quantities of the solution transferred during printing from the substrates to the chip to flow by gravity out of the reservoirs and into the substrates so that a plurality of chips can be printed by the same mounting plate; and wherein the openings in the mounting plate are filled with a polymerizable mixture for the introduction of the substrates, and the mixture is then polymerized and optionally cross-linked.

2. The method as claimed in claim 1, wherein to structure the surface, a hydrophobic layer is deposited on the surface of the chip, the hydrophobic layer is then coated with a photosensitive resist, the resist is masked by irradiation and is removed in the locations where the hydrophilic surface areas are later to be located, the areas of the hydrophobic layer and the remaining areas of the resist are activated to become hydrophilic, optionally by plasma etching, and the resist is then removed and the hydrophobic areas underneath it are exposed.

3. The method as claimed in claim 1, wherein to structure the surface, a hydrophilic layer is deposited on the surface of the chip, the hydrophilic layer is then coated with a photosensitive resist, the resist is masked by irradiation and is removed in the locations where the hydrophobic surface areas are later to be located, a hydrophobic layer is deposited on the thus exposed areas of the hydrophilic layer and the remaining areas of the resist and the resist is then removed by etching and the areas of the hydrophilic layer underneath are exposed.

4. The method as claimed in claim 1, wherein to structure the surface, a hydrophobic layer is deposited on the surface of the chip, a photo-polymerizable layer is deposited on the hydrophobic layer, and this layer is polymerized by masking with optical radiation into a hydrophilic polymer layer in the locations where the hydrophilic surface areas are intended to be.

5. The method as claimed in claim 1, wherein to structure the surface, a hydrophilic layer is deposited on the surface of the chip, a photo-polymerizable layer is deposited on the hydrophilic layer, and this layer is polymerized by masking with optical radiation into a hydrophobic polymer layer in the locations where the hydrophobic surface areas are intended to be.

6. The method as claimed in claim 1, wherein for the introduction of the substrates, the openings of the mounting plate are filled with at least one monomer, and the monomer is then polymerized, optionally by bringing it into contact with a polymerization initiator.

7. The method as claimed in claim 1, wherein, before the filling of the openings with the polymerizable mixture and/or a monomer, the interior walls of the openings are coated with a silane and the silane optionally has a chemical group which is capable of initiating the polymerization when it is brought into contact with the monomer.

8. The method as claimed in claim 1, wherein the mounting plate is immersed in the polymerizable mixture and/or a monomer in an underpressure or vacuum so that the polymerizable mixture and/or monomer penetrates into the openings, and the underpressure or the vacuum is then removed.

9. The method as claimed in claim 1, wherein the openings are introduced into the mounting plate in the form of openings all the way through that run transverse to the plane of extension of the mounting plate, and the solutions that each contain at least one coating substance are fed to the substrates on a side of the mounting plate opposite the side facing the chip in a use position.

10. A method for the manufacture of a microarray, whereby hydrophilic surface areas of a chip are placed in contact with different aqueous solutions containing at least one coating substance, comprising the steps of (a) for each of the individual surface areas an absorbent substrate is prepared on a mounting plate, and is filled with the solution to be brought into contact with the individual surface area, and (b) for the printing of the surface area with the at least one coating substance contained in the solution, the substrate is then brought into contact with the individual surface area, wherein the surface of the chip is structured so that the hydrophilic surface areas are separated from one another by at least one hydrophobic surface area, wherein in the surface of the mounting plate, in locations that correspond to the locations in which the hydrophilic surface areas of the chip are located, openings are introduced, the substrates are located in these openings so that they each project with a portion of their area out of the opening above the surface of the mounting plate, and for the printing of the hydrophilic surface areas of the chip, the mounting plate and the chip are positioned relative to each other so that the projecting areas of the substrates each come into contact with a corresponding hydrophilic surface area of the chip, wherein on a side of the mounting plate opposite the side facing the chip, reservoirs are formed in the mounting plate, each of which is located adjacent to and connected with a corresponding opening in the mounting plate, wherein the reservoirs are filled with solutions that contain at least one coating substance, wherein the reservoirs have a larger cross section than the openings, wherein the mounting plate is a single, one-piece construction and the reservoirs and opening are integrally formed in the mounting plate;

wherein the arrangement of the reservoirs relative to their corresponding opening and the construction of the reservoirs enable the quantities of the solution transferred during printing from the substrates to the chip to flow by gravity out of the reservoirs and into the substrates in the openings so that a plurality of chips can be printed by the same mounting plate; and wherein the openings in the mounting plate are filled with a polymerizable mixture for the introduction of the substrates, and the mixture is then polymerized and optionally cross-linked.

* * * * *